Patented May 26, 1936

2,042,331

UNITED STATES PATENT OFFICE 2,042,331

SEPARATION OF META CRESOL FROM META CRESOL-PARA CRESOL MIXTURE

Thomas S. Carswell, Kirkwood, Mo., assignor to Monsanto Chemical Company, St. Louis, Mo., a corporation of Delaware No Drawing. Application November 20, 1933, Serial No. 698,929

10 Claims. (Cl. 260—154)

This invention relates to the separation of meta cresol from a physical mixture of meta and para cresols and it is characterized in that a novel reagent is employed for this purpose to effect the separation.

The cresols which are obtained in commerce are by-products of the destructive distillation of coal and are recovered in their crude form physically admixed with phenol as well as several xylenols. Due to the differences in boiling points it is possible to separate phenol and ortho cresol, as well as xylenols, from the crude mixture. However, meta cresol cannot be separated from para cresol by fractional distillation due to the fact that the boiling points of these substances are practically identical. For this reason other methods of separation have in the past been employed. Among these methods are those which depend upon the formation of a solid addition compound with one of the constituents from which the other constituent may be separated by physical means, after which the separated addition compound is resolved into its components. Methods of separation which involve this principle include the oxalic acid method of separating para cresol from a meta-para mixture, the urea method of separating meta cresol from a meta-para mixture, and the sodium acetate method of separating meta cresol from the meta-para mixture.

I have now found that it is possible to separate meta cresol from a mixture of meta and para cresols by taking advantage of the fact that meta cresol forms a solid addition product with phenol even in the presence of para cresol, which addition product may be separated from the residual liquid para cresol. This addition product of meta cresol and phenol suspended in a liquid phase of para cresol represents a useful product in that it is a material from which pure meta cresol may be isolated practically and conveniently.

It has been shown heretofore (Journal of the Chemical Society of London, volume 113, pages 923–35 of 1918) that phenol forms addition products with ortho cresol, meta cresol, as well as para cresol, and also that the various cresols form addition products with each other. In view of the number of addition compounds involved and particularly in view of the fact that the commercially available mixtures of meta and para cresols usually contain a small amount of ortho cresol, it is unexpected that one can form a solid addition compound of meta cresol and phenol to the exclusion of other addition compounds.

I have now found that such is the case and that it is possible to obtain substantially pure meta cresol by means of the solid phenol addition product and further that the solid addition product may be separated readily by physical means from the liquid fraction, and finally that it may be resolved into its constituents by simple fractional distillation.

The following example will serve to illustrate the principles of my invention:

1000 parts of a mixture of meta and para cresols such as is produced by refiners of cresylic acid and which contains meta cresol and para cresol in approximately the ratio of 6:4, is mixed with 260 parts of phenol. The resulting mixture is cooled slowly to about 0° C. using equipment which is well-known to those acquainted with the practice of crystallization, whereupon a crystalline meta cresol-phenol addition product, consisting of two mols of meta cresol combined with one mol of phenol, separates. The liquid fraction is then drained from the crystals or the separation may be effected by centrifugation or pressing. For obvious reasons the separation of the liquid fraction which is relatively rich in para cresol should be as complete as possible. By careful draining one obtains approximately 690 lbs. of crystalline product which has an appearance not unlike fine granular sugar and consists of the addition compound of two mols of meta cresol and one mol of phenol.

If desired, the product may be melted and recrystallized. However for most purposes this is unnecessary and it may be resolved into its components by conventional fractional distillation whereupon one obtains phenol which is again used in the next cycle of operation and meta cresol which upon analysis will be shown to have a purity of approximately 95%. If desired, the meta cresol so obtained may be purified further by subjecting it to fractional crystallization in a manner well understood by those skilled in the art.

The drainings from the first crystallization of the cresol-phenol mixture will be found to contain:

| | Parts |
|---|---|
| Meta cresol | 120 |
| Para cresol | 400 |
| Phenol | 50 |

This mixture is then subjected to fractional distillation in order to remove the phenol which is present whereupon one obtains a mixture of meta and para cresols which is rich in para cresol (approximately 77%). From this mixture one may obtain para cresol directly by crystallization or one may employ the oxalic acid method for recovering pure para cresol. In either case the residual meta cresol-para cresol mixture may be returned to the first step of my process.

Although the specific procedure described above involves the use of a meta cresol-para cresol mixture having an approximate ratio of 6:4, this being readily available in the arts, it is to be understood that the invention is not restricted to this particular composition but may be applied to widely different compositions. It is also to be understood that the presence of small amounts of ortho cresol may be tolerated within the spirit of the present invention.

From the foregoing it will be apparent that my invention affords the refiner of cresylic acid a means of separating meta cresol from meta-para mixture with the aid of a reagent, phenol, which is readily available to him, it being a substantial component of tar acids. It will likewise be apparent that the physical operations are conventional, the technique of which is well understood by those engaged in the art of refining tar acids. Although but one specific example has been set forth and certain variables have been indicated, the invention is not so limited except as indicated by the appended claims.

What I claim is:

1. In a method of separating meta cresol from a liquid mixture of meta and para cresols, the steps which comprise causing meta cresol present in the mixture to combine with phenol and separate as a solid from the mixture and physically separating the solid meta cresol-phenol product from the residual liquid fraction.

2. In the separation of meta cresol from para cresol the step which comprises forming, in the presence of para cresol, a solid addition product of meta cresol with phenol.

3. A composition of matter consisting essentially of a solid addition product of meta cresol and phenol suspended in a liquid phase of para cresol.

4. The method of producing meta cresol which comprises fractionally distilling the addition compound of meta cresol-phenol wherein the ratio of meta cresol to phenol is 2:1.

5. The method of separating meta cresol from its mixture with para cresol, characterized in that phenol is added to the mixture in an amount not substantially in excess of that required to develop a ratio of meta cresol to phenol of 2:1, adjusting the temperature to produce a uniform liquid mixture of the cresols and phenol, subsequently cooling the mixture thereby causing the separation of a meta cresol-phenol solid wherein the ratio of meta cresol to phenol is 2:1, and physically separating the solid product from the residual liquid fraction.

6. The method of separating meta cresol from its mixture with para cresol, characterized in that phenol is added to the mixture in an amount not substantially in excess of that required to develop a ratio of meta cresol to phenol of 2:1, adjusting the temperature to produce a uniform liquid mixture of the cresols and phenol, subsequently cooling the mixture thereby causing the separation of a meta cresol-phenol solid wherein the ratio of meta cresol to phenol is 2:1, physically separating the solid product from the residual liquid fraction, and finally recovering pure meta cresol by fractional distillation of said separated solid product.

7. A method of separating meta and para cresol which comprises forming a liquid mixture of the two cresol isomers with phenol, the phenol being in the proportion of approximately one mol for each two mols of meta cresol, then slowly cooling the solution until the addition product of phenol and meta cresol separates out as a solid product, and removing the para cresol fraction.

8. A process as defined in claim 7 in which the mixture is cooled approximately to 0° C.

9. A method of separating meta cresol from para cresol which comprises forming the reaction product of meta cresol and phenol in a molten solvent consisting mainly of para cresol and crystallizing the reaction product from the solvent.

10. A method of separating meta cresol and para cresol where the ratio of the meta isomer to para is higher than approximately 3:10, which comprises forming a phenol addition product with the meta isomer containing two mols of meta cresol to one of phenol and crystallizing the addition product from a molten solvent consisting mainly of the para compound.

THOMAS S. CARSWELL.